United States Patent
Hall et al.

(10) Patent No.: US 9,973,984 B1
(45) Date of Patent: May 15, 2018

(54) SATELLITE SYSTEM WITH SWITCHED COMMUNICATION CHANNELS AMONG EARTH STATIONS

(71) Applicant: Northrop Grumman Systems Corporation, Falls Church, VA (US)

(72) Inventors: Dennis M. Hall, Manhattan Beach, CA (US); Hau H. Ho, Huntington Beach, CA (US); Kiet D. Ngo, Hermosa Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 64 days.

(21) Appl. No.: 15/260,393

(22) Filed: Sep. 9, 2016

(51) Int. Cl.
| | |
|---|---|
| *H04W 4/00* | (2018.01) |
| *H04W 36/00* | (2009.01) |
| *H04W 16/28* | (2009.01) |
| *H04W 84/06* | (2009.01) |

(52) U.S. Cl.
CPC ....... *H04W 36/0072* (2013.01); *H04W 16/28* (2013.01); *H04W 84/06* (2013.01)

(58) Field of Classification Search
CPC ..... H04W 88/02; H04W 4/008; H04W 84/06; H04W 88/06; H04W 24/10
See application file for complete search history.

(56) References Cited

U.S. PATENT DOCUMENTS

| | | |
|---|---|---|
| 6,545,787 B1 | 4/2003 | Lenormand et al. |
| 6,912,075 B1 | 6/2005 | Ionov et al. |
| 9,735,859 B1* | 8/2017 | Snyder ............... H04B 7/18517 |
| 2006/0212910 A1* | 9/2006 | Endres ................... H04H 20/63 725/73 |
| 2010/0309839 A1* | 12/2010 | Goldshtein ........ H04B 7/18528 370/316 |
| 2015/0381266 A1* | 12/2015 | Fujimura ........... H04B 7/18515 370/318 |

FOREIGN PATENT DOCUMENTS

| | | |
|---|---|---|
| EP | 2723001 | 4/2014 |
| WO | 01/059961 | 8/2001 |

OTHER PUBLICATIONS

Giggenbach, D. et al; A High-Throughput Satellite System for Serving whole Europe with Fast Internet Service, Employing Optical Feeder Links; In Broadband Coverage in Germany, 9th ITG Symposium Proceedings, pp. 49-55; Apr. 20-21, 2015; ISBN 978-3-8007-3925-7; Berlin—Offenbach.

(Continued)

*Primary Examiner* — Khalid Shaheed
(74) *Attorney, Agent, or Firm* — Patti & Malvone Law Group, LLC

(57) ABSTRACT

An exemplary satellite in a communication system supports communications among earth stations and has a first receiver that receiving a first RF signal transmitted from a first earth station that is down converted to a first electrical IF signal. An up converter converts a second electrical IF signal, from a second earth station carrying information for the first earth station, to a second RF signal and transmits it to the first earth station. A switch switches remotely reconfigurable electrical IF communication circuits between pairs of ports. Signals carrying information to be communicated between the first and second earth stations are linked together by the switch.

16 Claims, 6 Drawing Sheets

(56) References Cited

OTHER PUBLICATIONS

Aloisio, M. et al; Technological challenges of future broadband telecommunication satellites in Q/V-band; In Wireless Information Technology and Systems (ICWITS), 2012 IEEE International Conference on, pp. 1-4; IEEE, Nov. 2012; 978-1-4673-0946-2.

De Sanctis, M. et al; Optimization of ACM algorithms over Q/V-band satellite channels with the Alphasat Aldo Paraboni P/L; in Aerospace Conference, 2015 IEEE; pp. 1-9; Mar. 7-14, 2015.

Jeannin, N. et al; Smart gateways for terabit/s satellite; International Journal of Satellite Communications and Networking; vol. 32, No. 2 (2014); pp. 93-106; ISSN 1542-0973.

Chan, V.W.S. et al; Optical satellite networks; in Lightwave Technology, Journal of , vol. 21, No. 11, pp. 2811-2827; Nov. 2003; 0733-8724/03.

Rahmat-Samii, Y. et al; Technology Trends and Challenges of Antennas for Satellite Communication Systems; in Antennas and Propagation, IEEE Transactions on , vol. 63, No. 4, pp. 1191-1204, Apr. 2015.

\* cited by examiner

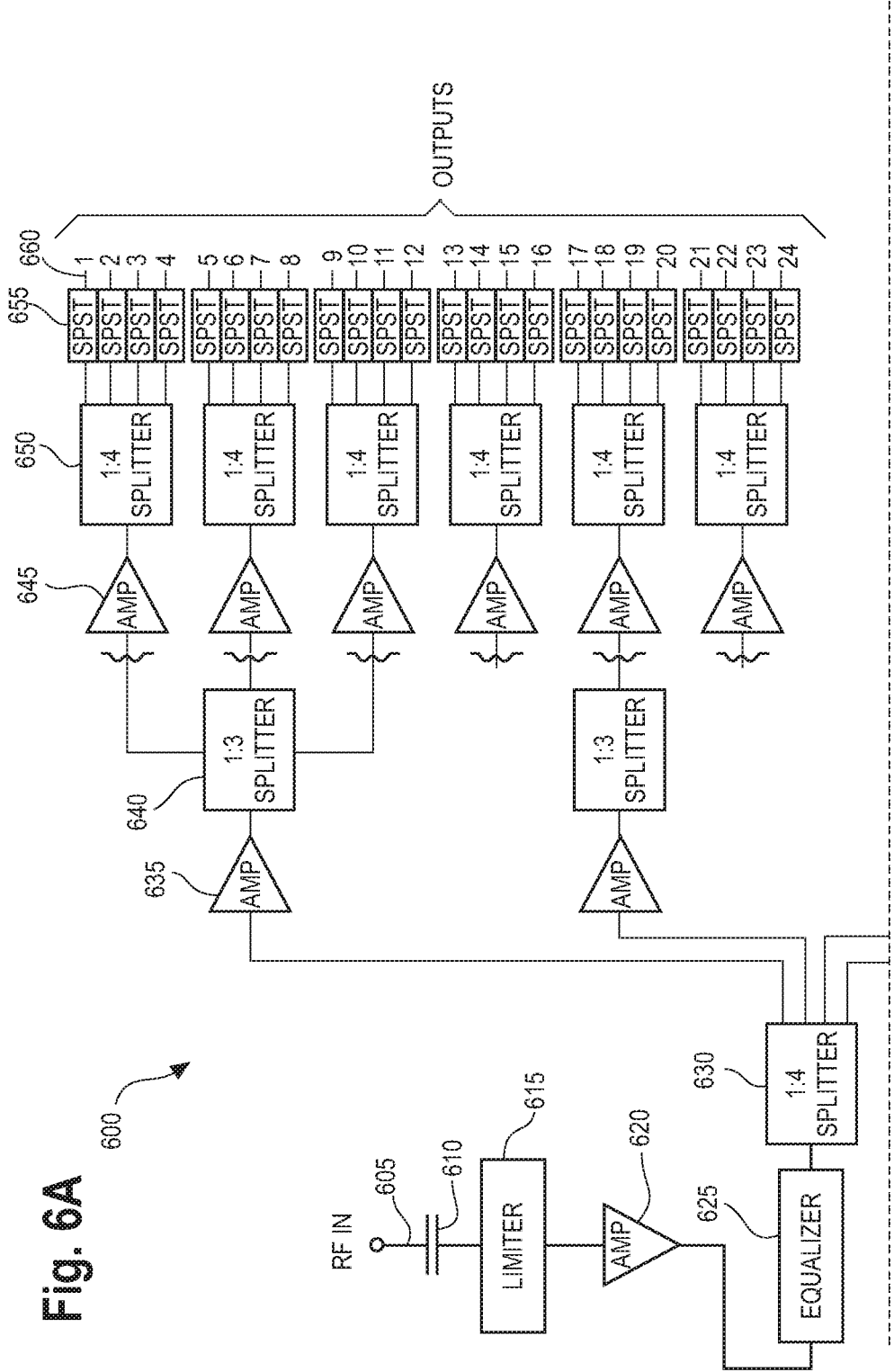

SATELLITE SYSTEM WITH SWITCHED COMMUNICATION CHANNELS AMONG EARTH STATIONS

BACKGROUND

This invention relates to communication systems with satellite communication channels providing links among a plurality of earth stations.

Communication systems utilize satellites in different types of orbits. Satellites in a geostationary orbit (GSO) offer advantages as appearing to be stationary relative to a location on the earth. This enables the antennas on the earth stations to be aimed at the GSO satellite using a simple tracking system. Other communication systems utilize satellites having a low earth orbit (LEO) or a medium earth orbit (MEO). Because satellites in these systems are moving relative to corresponding earth stations, tracking of the position of a satellite as it moves through the field of view of the earth station is required. Additionally, as one satellite goes out of range of a particular earth station, communications must be handed off to another satellite coming into the field of view of the earth station.

Existing GSO satellites typically operating in the C band (about 3-7 GHz) or in the Ku band (about to 10-15 GHz) are used for trunking and very small aperture terminal (VSAT) applications. These satellites typically have 24 duplex transponders each with a 36 MHz bandwidth for up and down links, with each transponder supporting approximately 45 Mbps of data traffic. Thus, the data traffic capacity of each satellite is approximately 1 Gbps. Additionally, the beams from such satellites are fixed and are thus unable to allocate payload resources on an as needed basis. Commercial Ka band (17.7-30 GHz) satellites support VSAT applications. The data handling capacities and limited flexibility of transponders utilized by such Ka-band satellites are not well-suited to embrace the increasing demands for high data communications.

SUMMARY

It is an object of the present invention to satisfy this need.

An exemplary satellite in a communication system supports communications among earth stations and has a first receiver that receiving a first RF signal transmitted from a first earth station that is down converted to a first electrical IF signal. An up converter converts a second electrical IF signal, from a second earth station carrying information for the first earth station, to a second RF signal and transmits it to the first earth station. A switch switches remotely reconfigurable electrical IF communication circuits between pairs of ports. Signals carrying information to be communicated between the first and second earth stations are linked together by the switch.

DESCRIPTION OF THE DRAWINGS

Features of exemplary implementations of the invention will become apparent from the description, the claims, and the accompanying drawings in which:

FIGS. 6A and 6B show a block diagram of an exemplary 1 to 48 switching stage suited for use in the exemplary switch.

DETAILED DESCRIPTION

One aspect of the present invention resides in the recognition that the magnitude of future satellite supported traffic cannot be economically provided by merely adding more satellites, each with the current traffic handling capability. Additionally, the ability of reallocate communication paths intra-satellite on a timely basis and the ability to have direct optical crosslink between satellites would provide increased flexibility as compared to existing systems. Also, the ability of change the satellite's RF beam direction for satellite-to-earth station communications would provide increased flexibility.

Figure 1:
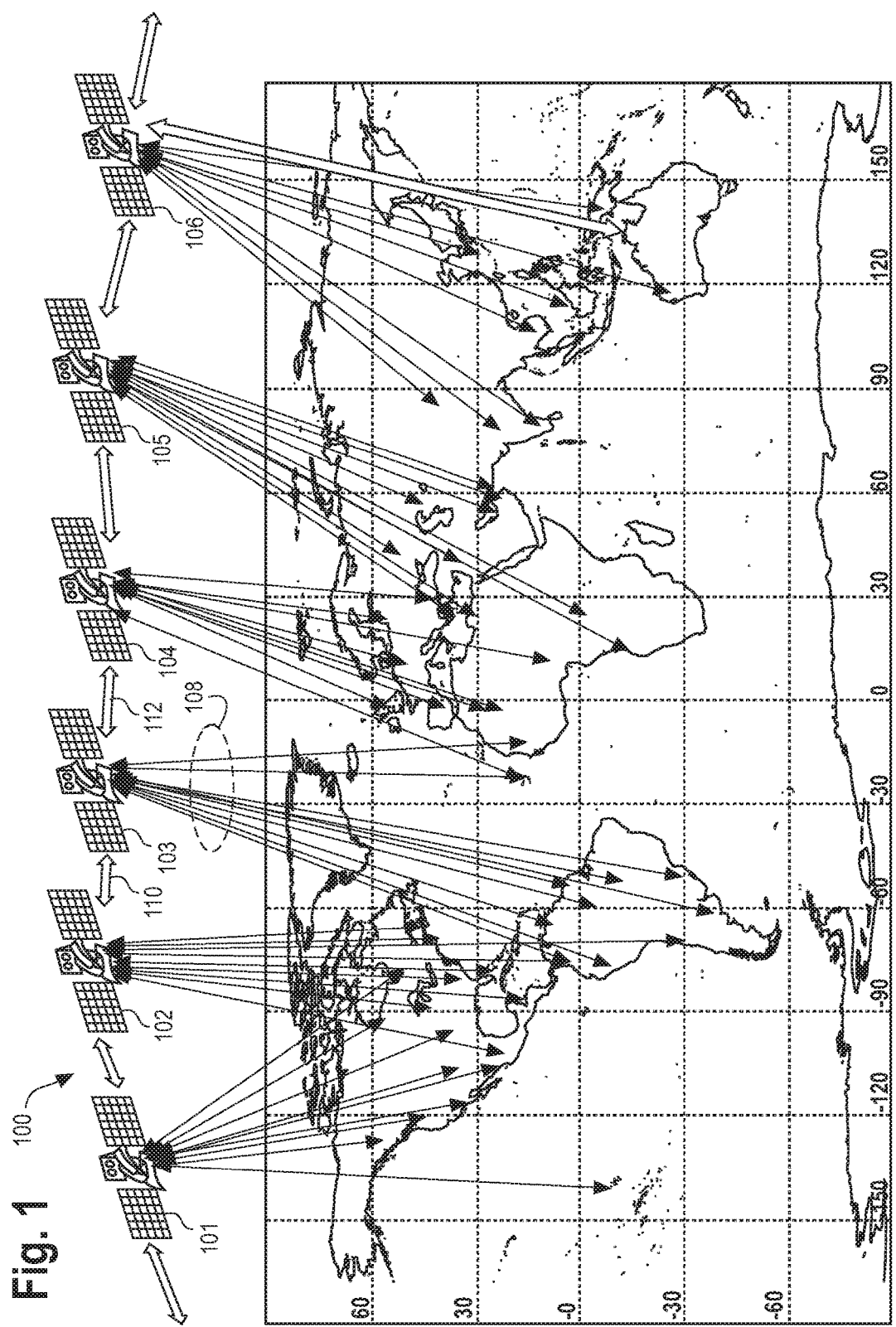
FIG. 1 is an artist's depiction of an exemplary embodiment of a worldwide communication system where a plurality of satellites (i.e. six satellites) support communications with both adjacent satellites and with earth stations located around the world.

FIG. 1 shows an exemplary embodiment of a worldwide communication system 100 where a plurality of satellites (i.e. six satellites) 101-106 support communications with associated earth stations located around the world. Each satellite is capable of simultaneous duplex communications with a plurality of earth stations, e.g. 12 earth stations. Each satellite has a separate gimbal disk assembly, including a remotely directable earth-facing antenna, for each of the 12 earth stations. Thus, each satellite supports a plurality of duplex RF communication channels 108, e.g. using 40/50 GHz links, for communications with the respective earth stations which may be located anywhere on earth within the effective field-of-view of the respective satellite.

Communication coverage across much of the world is supported by the illustrative communication system as shown. For example, satellite 101 supports central and western portions of the US and Canada and regions of the eastern Pacific Ocean. Satellite 102 supports central and eastern portions of the US and Canada as well as western portions of South America. Satellite 103 supports central and eastern areas in South America, regions in the Atlantic Ocean and western portions of Africa/Europe. Satellite 104 supports Scandinavian countries, Western Europe and parts of North Africa. Satellite 105 supports central and eastern Africa, the Middle East, Eastern European countries and Western Asia. Satellite 106 supports India, Eastern Asia and the Western Pacific region including Australia. It will be understood that these mentioned service areas are merely representative of the significant scope of coverage provided by such a communication system.

Satellite to satellite direct communications are supported in order to facilitate communications between an earth station served by one satellite and another earth station served by a different satellite without requiring a supplementary ground network . As exemplary for each of the satellites, satellite 103 has a duplex optical link 110 with its adjacent Western satellite 102 and a duplex optical link 112 with its adjacent Eastern satellite 104. Each optical link may, for example, support 20 OC-192 communication streams.

Thus, each satellite can establish a communication channel with any other satellite using a daisy-chain communication technique.

Figure 2:
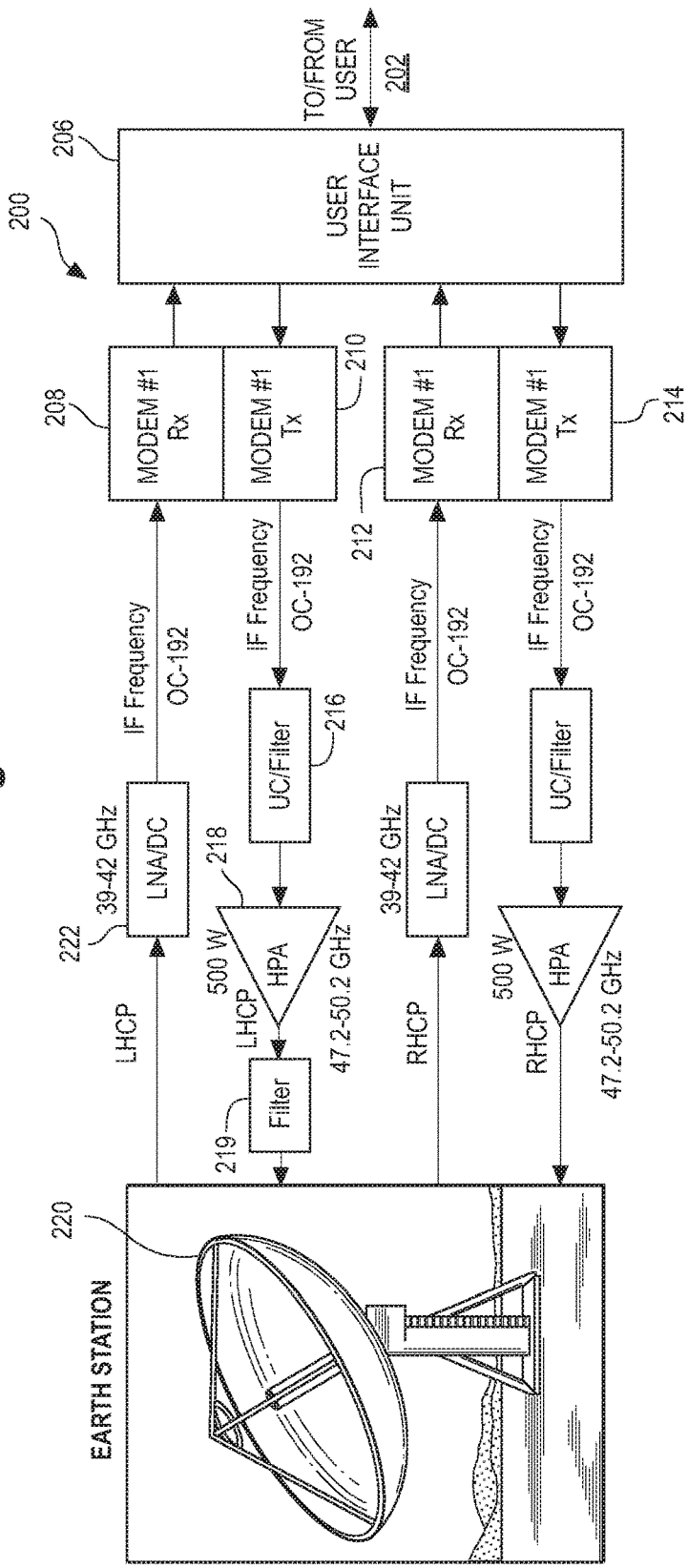
FIG. 2 is a block diagram of an exemplary earth station that supports communications with one of the satellites.

FIG. 2 illustrates an exemplary earth station 200 that supports duplex RF communications between one of the satellites and a user data stream 202. In this exemplary embodiment, the user data stream 202 may support 4 OC-192 channels segregated into a pair of receive and transmit channels of 1 OC-192 each. A user interface unit 206 provides an electrical to optical and optical to electrical interface between electrical signals based modems 208, 210, 212, 214 and the optically modulated information carried on user data stream 202. The transmit modem 210 generates an intermediate frequency (IF) signal that carries the information encoded on 1 OC-192 user transmit data channel which is coupled to up converter that converts the IF signal to a final transmit frequency, e.g. 47.2-50.2 GHz, then filter 216 filters the signal to reject unwanted signals/noises, etc. The filtered signal is amplified by a high power amplifier 218, e.g. 500 W, and is then filtered by a transmit filter 219 to reject harmonics/out-of-band emissions, etc. The output of the transmit filter is then coupled to the earth station dish antenna 220, e.g. which may be 11 meters in diameter, which radiates a left-hand or right-hand circular polarized RF signal to the satellite. On the corresponding receive side of the duplex channel associated with transmit modem 210, antenna 220 receives a left-hand or a right-hand circular polarized RF signal, e.g. 39-42 GHz, (preferably the same polarization as used in the corresponding transmit channel) and provides the signal as an input to the low noise amplifier and down converter 222 which amplifies the signal and provides a down frequency conversion to an IF. The receive modem IF may be the same or different from transmit modem IF. This output from the LNA/DC 222 is provided as an input to the receive modem 208 that provides the recovered information to the user interface unit 206 for conversion into an optical 1 OC-192 that provides one receive signal stream of the user data stream 202. The duplex transmit and receive signals associated with modems 208 and 210 form one of the two pairs of a duplex communication streams part of user data stream 202. The other of the two pairs of duplex communication streams are associated with modems 212 and 214, and operate similarly as previously described for the other pair except that the signals to and from antenna 220 are right-hand circular polarized instead of left-hand circular polarized signals. The satellite associated with antenna 220 supports the transmission and reception of the two pairs of duplex communication channels as described for station 200. In this exemplary embodiment, each of the four channels of the two pairs of duplex communication channels supports a 3 GHz bandwidth signal capable of carrying 10 Gbps of data.

Figure 3:
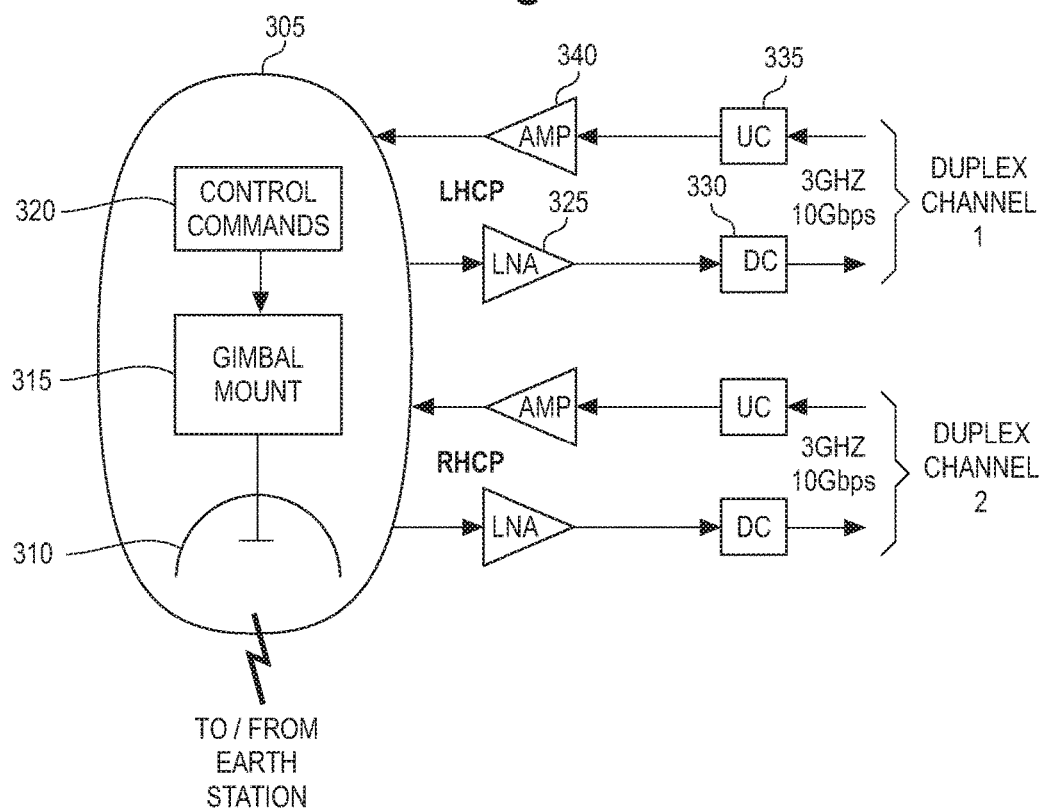
FIG. 3 is a block diagram of satellite's communication interface associated with a gimbal disk assembly supporting controllable RF beam direction for communications with an earth station.

FIG. 3 shows a satellite gimbal disk assembly (GDA) 305 and associated RF communication interface for 4 RF communication channels with an earth station, e.g. earth station 200. The GDA 305 includes an earth looking antenna 310 with a changeable orientation towards a particular earth station controlled by gimbal mount 315. A control/command module 320 receives and decodes signals that controls the orientation provided by the gimbal mount 315. The control signals may be received from a master earth station having predetermined coordinates stored in a corresponding master GDA that controls the orientation of one of the GDAs. This enables each of the other plurality of GDAs (i.e. 11 GDAs) to be oriented towards its corresponding earth stations anywhere within the field-of-view of the satellite on which the plurality of GDAs are mounted. Each of the plurality of GDAs supports 2 duplex communication channels with each channel having a 3 GHz bandwidth capable of supporting 10 Gbps.

The duplex channel 1 includes a received communication channel with a receive signal provided from GDA 305 to the input of a low noise amplifier 325. The output of LNA 325 is received by a down converter 330 that converts the received 47.2-50.2 GHz signal to a lower (IF) frequency which provides an input to the channel switch as will be described in more detail below. The transmit side of the duplex channel 1 comes from an output from the channel switch at the IF frequency. It is received as an input by up converter 335 which converts the signal to the 39-42 GHz range. The signal is then amplified by amplifier 340 and coupled to GDA 305 for transmission by antenna 310 to the corresponding earth station. Both the receive and transmit channels of duplex channel 1 have left-hand circular polarization. The duplex channel 2 supported by GDA 305 includes the same components and operates similarly as described above with regard duplex channel 1. In order to provide signal separation between duplex channels 1 and 2, the communication channels associated with duplex channel 2 are right-hand circular polarized.

Figure 4:
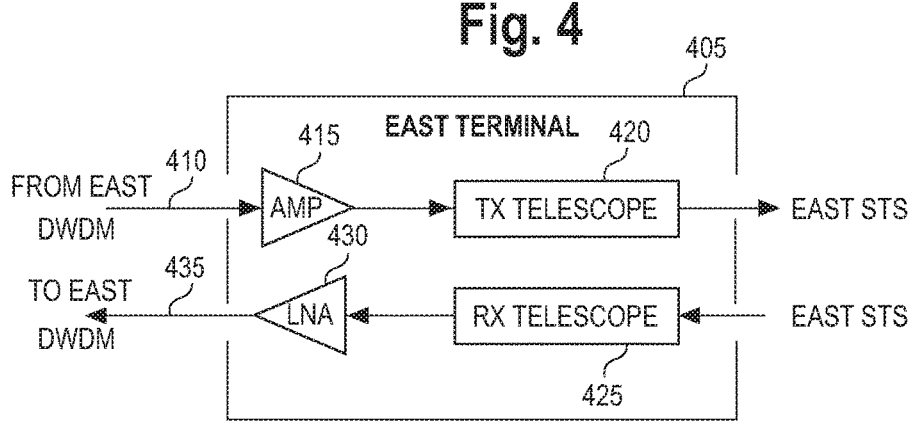
FIG. 4 is a block diagram showing exemplary satellite to satellite direct optical communication interface for supporting communications with other adjacent satellites.

FIG. 4 shows an exemplary East terminal 405 that provides an optical communication interface that supports satellite to satellite direct optical communications (STS) with the Eastern adjacent satellite. A dense wavelength division multiplexed (DWDM) optical signal 410 is amplified by an optical amplifier 415. The amplified output from amplifier 415 is received as an input by the transmit side telescope 420 which is oriented to transmit the light beam carrying the signals to the adjacent Eastern satellite. A light beam from the adjacent Eastern satellite is received by receive side telescope 425 which is coupled as an input to an optical low noise amplifier 430. The amplified output 435 consists of a DWDM optical signal as received from the adjacent Eastern satellite. Not shown is a mirror image West Terminal in the same satellite oriented towards the Western adjacent satellite that provides similar optical communications between the subject satellite and the Western adjacent satellite. Thus, there is a direct duplex optical communication channel between each satellite and the two adjacent most satellites.

Figure 5:
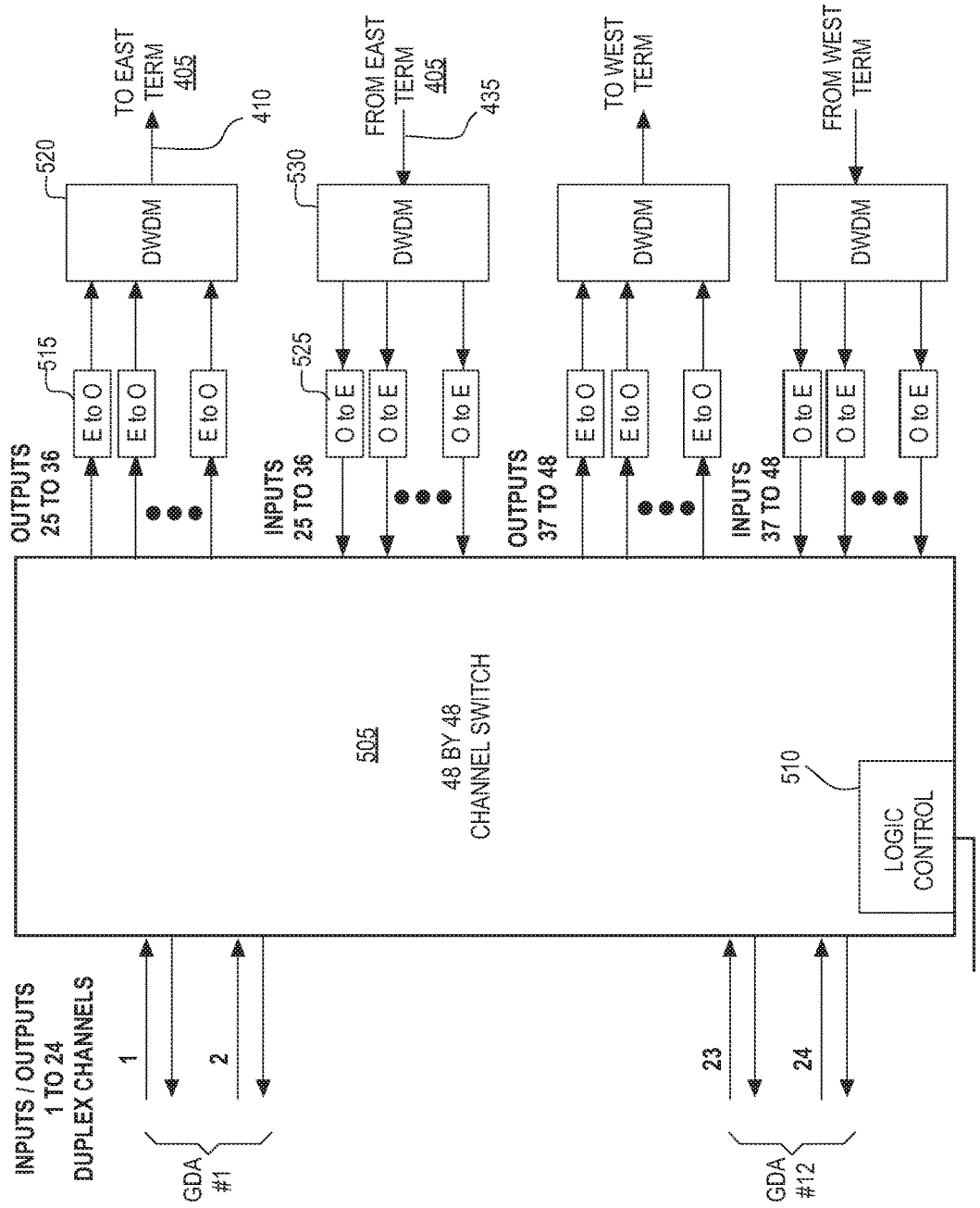
FIG. 5 is a block diagram of an exemplary switch architecture for switching communication paths in accordance with an embodiment of the present invention.

FIG. 5 shows an exemplary channel switch 505 and associated circuitry for switching communication paths internal to the satellite in accordance with an embodiment of the present invention. In this exemplary embodiment channel switch 505 is capable of switching/routing 48 duplex communication channels from one input/output port to another input/output port, preferably in a non-blocking manner. As shown in FIG. 5, duplex channels 1-24 associated with communication channels of GDA 1-12 are coupled to respective ports of switch 505. Duplex channels 25-48 associated with STS communications are coupled to respective ports of switch 505. Each of the 48 duplex channels carry electrical signals at the IF RF frequency having 3 GHz of bandwidth and capable of supporting 10 Gbps. Thus, the switch 505 supports 960 Gbps of data (96 channels×10 Gbps).

Logic control circuitry 510 receives control signals, e.g. from an earth station, and controls the interconnection by switch 505 of the duplex ports, i.e. which input port is connected to which output port. Each of the output ports associated with duplex channels 25-36 are coupled to an electrical to optical converter 515 having the respective outputs coupled to a DWDM multiplexer 522 provide a combined signal 410 to be transmitted to the Eastern satellite. Each of the input ports associated with duplex channels 25-36 are coupled to an optical to electrical converter 525 which receives optical signals from DWDM demultiplexer 530 as received from the Eastern satellite. The other 12 duplex ports of switch 505 associated with inputs/outputs 37-48 are coupled to the communication channels associated with the Western satellite in a similar manner as explained above with regard to the Eastern satellite.

Figure 6B:
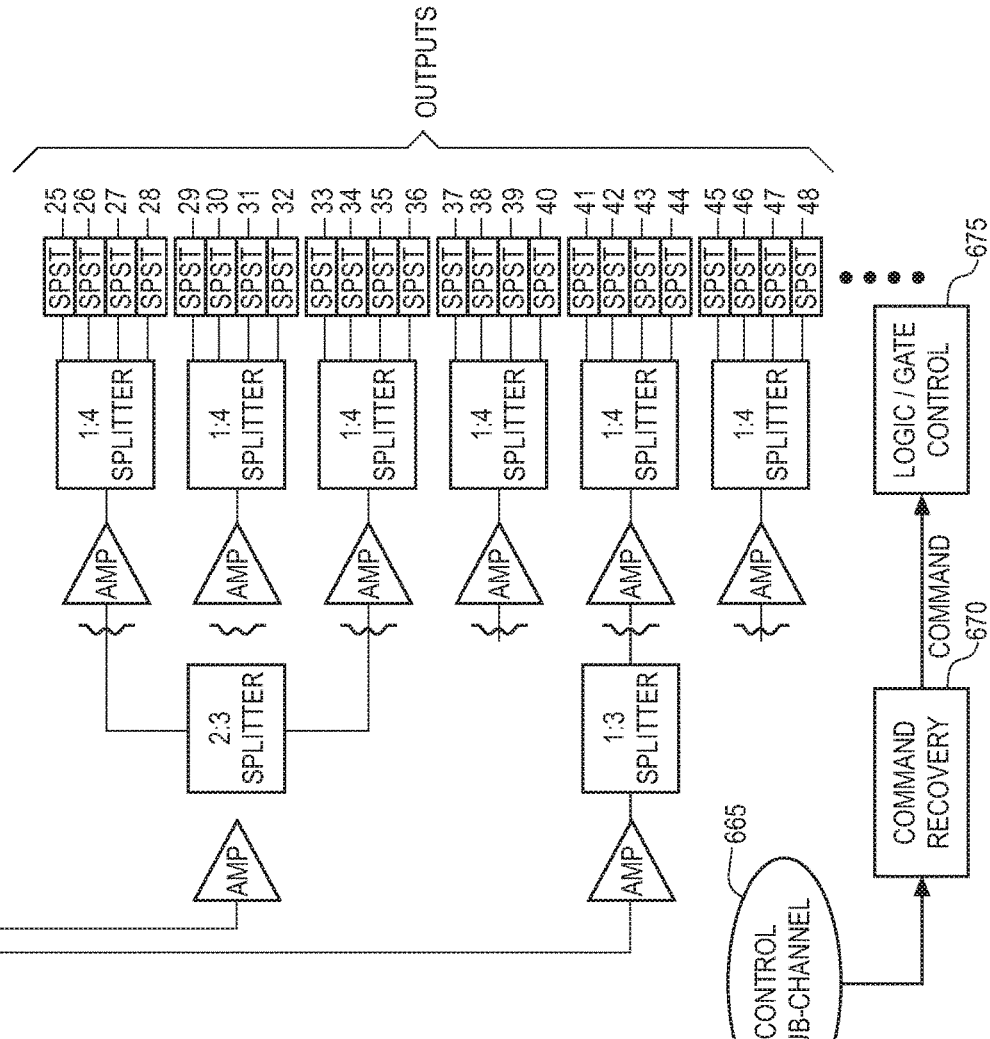

FIGS. 6A and 6B show exemplary switching circuitry 600 for one input port of the switch 505. An RF input signal is coupled to terminal 605 and through capacitor 610 to a signal limiter 615 that limits the magnitude of the signal. The output of limiter 615 is amplified by amplifier 620 and amplitude level adjusted by equalizer 625 before being coupled to a 1:4 splitter 630. Each of the four outputs from splitter 630 is coupled to four identical sets of circuitry; only the first set need be described. The signal from splitter 630 is amplified by amplifier 635 before being split by a 1:3 splitter 640. Each of the three signals from splitter 640 is amplified by an amplifier 645 before being coupled to a 1:4 splitter 650. Each of the four outputs from splitter 650 is coupled to a single pole single throw (SPST) switch 655 having a corresponding output 660. As seen in FIGS. 6A and 6B, the amplifying and splitting of the RF input signal on terminal 605 results in one input signal being selectably coupled to one of the outputs 1-48 assuming that all of the 48 SPST switches 655 at a given time are in the open state except for one switch that is closed, i.e. the closed switch determining the output of the 48 possible outputs to which the input signal is coupled.

A control subchannel 665 may convey control instructions from an earth station. The instructions are coupled to a command recovery module 670 for decoding the instructions relating to which of the SPST switches in each input stage is to be closed, it being assumed that the other SPST switches for the input stage will be open. The decoded instructions are sent as a command to logic and gate control module 675 which is coupled to each of the SPST switches 655 in each of the 48 input stages with corresponding open/close state of the switches determined based on the information received from module 675. Assuming that only one of the SPST switches 655 of stage 600 (and of the other 47 input stages) is closed at a given time, this represents the ability to switch each of the 48 RF input signals to any one of the outputs 1-48 at a given time.

To create the exemplary switch 505, 48 input stages corresponding to stage 600 could be utilized with the matching SPST switch outputs connected in parallel, i.e. output #1 from each input stage connected together, etc. Each of the 48 outputs will have only one input signal connected to it at a given time since only one of the 48 SPST switches connected in parallel for that output number will be closed, i.e. the other 47 parallel connected outputs from the other 47 input stages will be open at a given time. Each of the 48 input signals is an RF signal at an IF capable of carrying 3 GHz of bandwidth and 10 Gbps of data. Thus, an IF electrical (as opposed to optical) signal with the same data carrying capabilities is switched among each input and output by the switch 505.

The embodiment of the present invention provides several advantages. A combination of steerable RF beams, frequency re-use, optical communication for inter-satellite link (ISL), satellite on-board IF switching, and a plurality of GSO and Polar orbiting satellites allows a dynamic allocation of channels/bandwidth among users around the globe, i.e. such allocations can be implemented by signals sent from a TT&C (Telemetry, Tracking, and Command) ground control satellite network. The GDAs facilitate steerable RF beams anywhere with the satellite field-of-regard allowing re-assignment of the channels/payload resources supported by repositioning antenna beam(s) to another location(s) than the previously located assignment. In order to allow several earth stations to operate at the same frequencies, the interference levels caused by such common usage must be at or below acceptable levels by: 1) keeping the physical distance between two such earth stations to typically at least 2 beams widths of the satellite antenna; or 2) using opposite polarizations, e.g. LHCP and RHCP, that provides about 25-27 dB of isolation. A mesh based network topology where each satellite is connected to both adjacent and non-adjacent (GSO and polar orbiting) satellites enhances routing flexibility for end users in the event of one or more satellites failures. Transportable earth stations are supported, i.e. users can request a satellite antenna beam to be aimed at a relocated earth station anywhere within the satellite field-of-view with only a short notice, e.g. one hour. Since the satellites utilize GDAs, the supporting satellite can be reconfigured by a signal from a TT&C ground control network to aim its antenna beam from one location to another location to serve the relocated earth station as long as the subject earth station is within the satellite field-of-view.

Although exemplary implementations of the invention have been depicted and described in detail herein, it will be apparent to those skilled in the art that various modifications, additions, substitutions, and the like can be made without departing from the spirit of the invention. For example, the RF band can be extended to include 71 to 76 GHz for downlink from satellite to earth station and 81 to 86 GHz for uplink from earth station to satellite to service additional users. Another modification is to include additional optical terminals on each satellite to allow a mesh topology connectivity among the satellites (where a satellite has direct optical links with 3 or more other satellites) which will further improve the system throughput capability; however, the switch matrix size needs to increase accordingly to accommodate this modification. Additionally, this invention can also be supplemented with polar orbit satellites that have direct optical links to the GSO satellites to further extend its global coverage capability and additional communication paths.

The scope of the invention is defined in the following claims.

The invention claimed is:

1. A satellite adapted to operate in a communication system with multiple satellites, the satellite supports communications among earth stations, the satellite comprising:
   a first receiver for receiving a first radio frequency (RF) signal transmitted from a first earth station;
   a down converter that converts the first RF signal to a first electrical intermediate frequency (IF) signal;
   an up converter that converts a second electrical IF signal to a second RF signal;
   a first transmitter for transmitting the second RF signal to the first earth station;
   a switch having a plurality of ports with remotely reconfigurable electrical IF communication circuits between pairs of ports, first and second pairs of ports each having respective input and output ports;
   an input port of the first pair of ports receives the first IF signal and an output port of the first pair of ports transfers the first IF signal to a path by which the information carried by the first IF signal is transmitted to a second earth station;
   an output port of the second pair of ports outputs the second IF signal and an input port of the second pair of ports receives the second IF signal that carries information transmitted from the second earth station.

2. The satellite of claim 1 wherein the switch supports the simultaneous circuit switching paths between the pairs of ports and contains logic control circuitry that is responsive to command signals received from a control earth station, the logic control circuitry determines which of the switch ports form respective pairs of interconnected ports and facilitates reconfiguration of the circuit switching paths in response to the command signals received from the control earth station.

3. The satellite of claim 1 wherein the switch supports the simultaneous circuit switching of at least 48 communication channels.

4. The satellite of claim 1 further comprising:
optical duplex communication apparatus supports direct optical communications for multiple channels between the satellite and at least two adjacently satellites;
an optical to electrical signal converter for converting optically received signals from another adjacent satellite to electrical IF signals;
an electrical to optical signal converter for converting electrical IF signals received from earth stations to optical signals for transmission to another adjacent satellite, providing a duplex communication channel capability between the first earth station and the second earth station that is serviced by another satellite.

5. The satellite of claim 1 further comprising:
a plurality of antennas that each receive and transmit RF signals with a corresponding earth station;
remotely controllable gimbal mounts on which corresponding antennas are affixed, the remotely controllable gimbal mounts determining the direction that the associated antenna is pointed;
a command signal apparatus implements commands received from a control earth station to control each remotely controllable gimbal mount and hence the direction that the associated antenna is pointed, wherein one antenna configured for communications with one earth station at one location can be remotely reconfigured for communications with another earth station at another location that is within the field-of-view of the satellite.

6. The satellite of claim 5 wherein 12 antennas are supported by 12 corresponding remotely controllable gimbal mounts.

7. The satellite of claim 5 wherein each antenna supports 2 duplex communication channels simultaneously, where each of the 2 duplex communication channels utilize the same transmit and receive frequencies but have different polarizations to allow differentiation of the 2 duplex communication channels.

8. The satellite of claim 5 wherein each of the received and transmitted RF signals carries at least 10 Gbps of data.

9. A method that supports communications among earth stations via a satellite communication system with multiple satellites, the method implemented by each satellite comprising the steps of:
down converting a first radio frequency (RF) signal, received from a first earth station with associated information having a destination of a second earth station, to a first electrical intermediate frequency (IF) signal;
up converting a second electrical IF signal carrying information from the second earth station to a second RF signal and transmitting the second RF signal to the first earth station;
switching a plurality of remotely reconfigurable circuit switched paths that carry electrical IF signals among pairs of ports, where each pair of ports has respective input and output ports;
receiving the first IF signal on an input port of a first pair of ports and transferring the first IF signal from an output port of the first pair of ports to a path by which the information carried by the first IF signal is transmitted to the second earth station;
receiving on an input port of the second pair of ports the second IF signal that carries information transmitted from the second earth station and outputting on an output port of the second pair of ports the second IF signal to be up converted and transmitted to the first earth station.

10. The method of claim 9 further comprising the steps of remotely reconfiguring the circuit switched paths between the pairs of ports in response to the receipt of command signals received from a control earth station, in response to the command signals implementing logic control changes that determines which of the switched ports form respective pairs of interconnected ports.

11. The method of claim 9 wherein at least 48 communication channels are simultaneously supported by the circuit switched paths.

12. The method of claim 9 further comprising the steps of:
using direct optical communications supporting multiple channels with at least two adjacently satellites;
converting optically received signals from another adjacent satellite to electrical IF signals;
converting electrical IF signals received from earth stations to optical signals for transmission to another adjacent satellite so that a duplex communication channel is established between the first earth station and the second earth station that is serviced by another satellite.

13. The method of claim 9 further comprising the steps of:
utilizing a plurality of antennas that each receive and transmit RF signals with a corresponding earth station;
mounting the antennas on remotely controllable gimbal mounts that determine the direction that the associated antenna is pointed;
implementing commands received from a control earth station to control each remotely controllable gimbal mount and hence the direction that the associated antenna is pointed, wherein one antenna configured for communications with one earth station at one location can be remotely reconfigured for communications with another earth station at another location that is within the field-of-view of the satellite.

14. The method of claim 13 wherein 12 antennas are supported by 12 corresponding remotely controllable gimbal mounts.

15. The method of claim 13 wherein each antenna supports 2 duplex communication channels simultaneously, where each of the 2 duplex communication channels utilize the same transmit and receive frequencies but have different polarizations to allow differentiation of the 2 duplex communication channels.

16. The method of claim 13 wherein each of the received and transmitted RF signals and each of the IF signals carries at least 10 Gbps of data.

* * * * *